Jan. 8, 1935.  M. S. RUDD  1,987,371

LAWN SWEEPER

Filed Feb. 19, 1934   2 Sheets-Sheet 1

M. S. Rudd  INVENTOR

BY Victor J. Evans & Co.

ATTORNEY

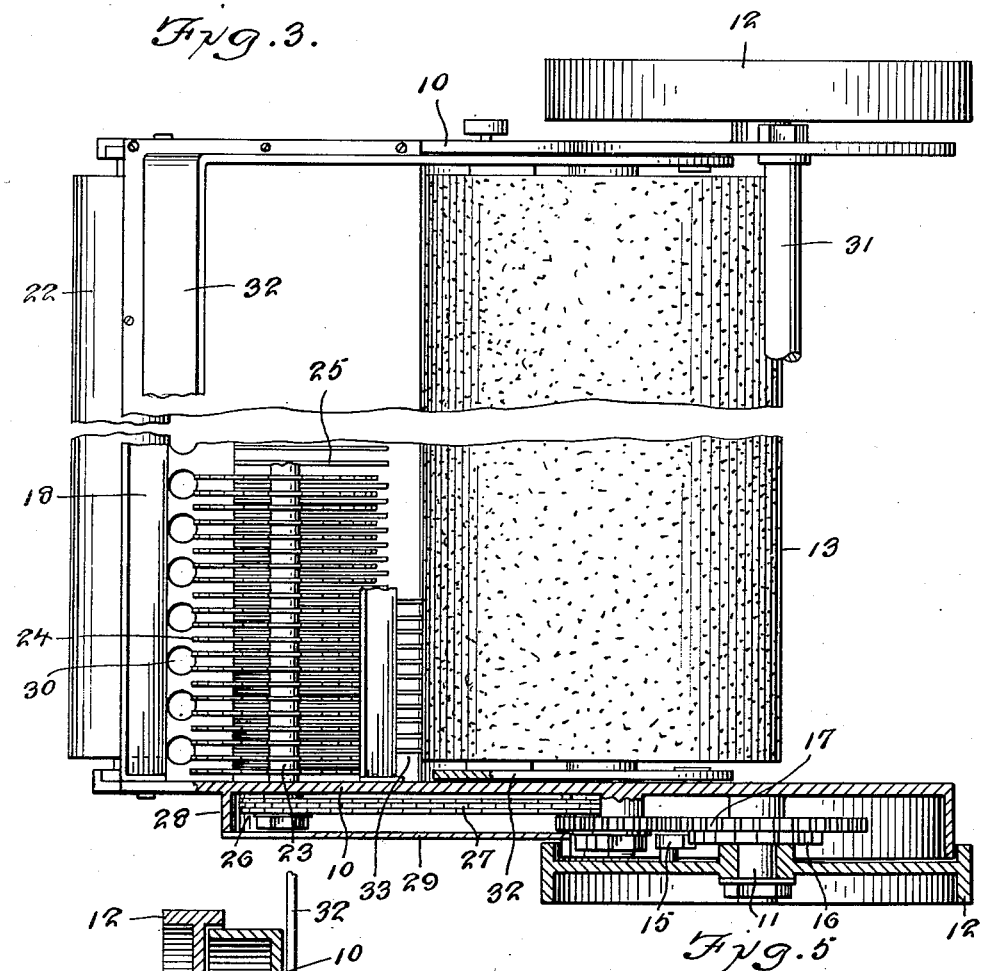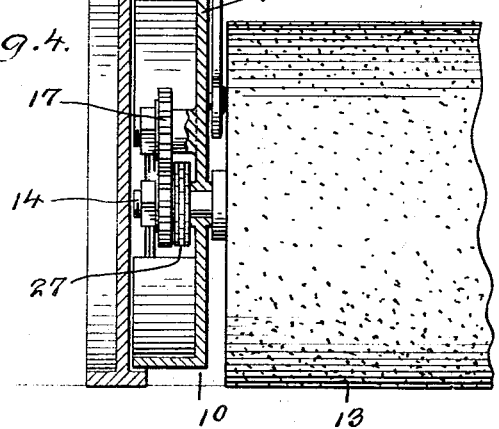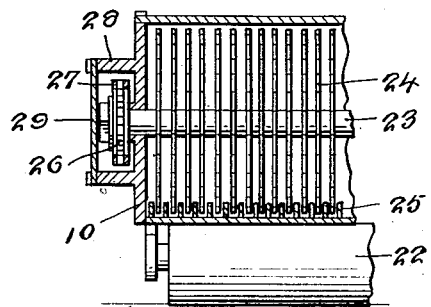

Patented Jan. 8, 1935

1,987,371

UNITED STATES PATENT OFFICE 1,987,371

LAWN SWEEPER

Matthew S. Rudd, Sewickley, Pa.

Application February 19, 1934, Serial No. 712,021

4 Claims. (Cl. 55—118)

The invention relates to a lawn sweeper and more especially to a lawn cleaner.

The primary object of the invention is the provision of a machine of this character, wherein fallen leaves, cut grass or other coverings present upon a lawn may be swept therefrom, gathered, and cut so as to comminute the same for the subsequent redeposit upon said lawn to function as fertilizer, the sweeping, cutting and redepositing being effected in a single operation of the machine which is hand power driven.

Another object of the invention is the provision of a machine of this character, wherein a lawn upon which leaves or the like have collected may be cleaned with dispatch and the material may be swept from the lawn into a receiver where such material will be acted upon by cutters for reducing the material to a kind for use as a fertilizer for the ground and the delivery of this reduced material onto the ground when the machine is advanced thereover, the machine in its entirety being of novel construction and convenient for either heavy or light work.

A further object of the invention is the provision of a machine of this character, wherein in the use thereof the necessity for hand gathering and hand toting of fallen leaves upon a lawn will be entirely eliminated, this being usually carried forth with a rake and a wheelbarrow or other like vehicle, and such machine will gather the loose leaves and thoroughly sweep the lawn clean, the leaves gathered being mutilated and subsequently redeposited for fertilizing purposes.

In the accompanying drawings:

Figure 1 is a side elevation of the machine constructed in accordance with the invention, a portion thereof being broken away for illustrating details.

Figure 2 is a vertical longitudinal sectional view through the machine.

Figure 3 is a top plan view partly broken away and partly in section.

Figure 4 is a sectional view on the line 4—4 of Figure 1, looking in the direction of the arrows.

Figure 5 is a sectional view on the line 5—5 of Figure 1, looking in the direction of the arrows.

Similar reference characters indicate corresponding parts throughout the several views in the drawings.

Referring to the drawings in detail, the machine in its make-up comprises a frame having the side pieces 10 which at their outer sides are provided with the stud axles 11 on which are journaled the traction or ground wheels 12, while located between the side pieces 10 is a circular sweeper or brush 13, its axle 14 being suitably journaled in said side pieces 10.

On one of the traction or ground wheels 12 is pivoted a ratchet dog or pawl 15 meshing with a ratchet gear 16 which is a part of one of a train of gears 17 constituting a driving connection between the said traction wheels and the sweeper or brush 13. It is to be understood, of course, that the sweeper or brush 13 is of a size approximately the distance between the side pieces 10 of the frame of the machine.

Provided in the frame of the machine between the side pieces 10, rearwardly of the sweeper or brush 13, is a receiver 18 having the entrance throat 19 in confronting relation to the sweeper or brush 13, so that the sweepings by the brush will be directed into the receiver 18, the throat at the lowermost portion thereof being fitted with a swinging scoop 20 carrying rollers 21 for traction upon the ground surface or the lawn bed and this scoop 20 directs the material swept by the sweeper or brush 13 in the direction of the throat 19 to be delivered into the receiver 18 when the machine is advanced over a lawn.

The frame, at the rear end, has connected therewith vertically adjustable caster wheels 22 for properly supporting the frame and for traction thereof at its rear end.

Journaled transversely in the receiver 18 is the power shaft 23 for a series of saw-toothed cutting disks or circular blades 24, these coacting with stationary blades 25 arranged at the bottom of the receiver 18, so that the material swept into the receiver will be cut or pulverized under the action of the blades 24 and 25 which cooperate with each other.

The shaft 23 for the blades 24 has driven connection through the medium of the sprocket gears and sprocket chains 26 and 27 with the shaft or axle for the sweeper or brush 13.

The train of gears 17 and the sprocket gears 26 and chains 27 are encased as at 28, such encasement including a removable cover plate 29, so that these driven connections will be concealed and will be protected from dust and dirt in the operation of the machine.

Formed in the bottom of the receiver 18 beyond the delivery side of the blades or cutters 24 is a series of discharge openings 30, so that the material cut or mutilated can be dispensed or discharged through these openings 30 onto the ground and thus utilized for fertilizing purposes.

The frame of the machine also includes the cross tie member 31 connected with the side pieces 10 to give rigidity and union to the frame parts.

Connected with the frame is a handle bar 32 for hand power advancement of the machine in the use thereof and this handle bar may be of any conventional kind.

In the use of the machine the same is advanced by hand over a lawn and the brush or sweeper 13 will remove loose leaves or other deposits or the like from the surface of the lawn and such material will be directed into the receiver 17, whence this material will be cut for comminuting the same, so that it will discharge through the openings 30 for deposit upon the ground and thus serve as a fertilizer.

By reason of the pawl or dog and the ratchet gear, back movement of the machine may be had without imparting driving power to the sweeper or brush 13 and the cutters or blades 24, as should be obvious.

Suitably arranged within the throat to engage with the sweeper or brush 13 is a combing element 33 to engage the bristles of the sweeper or brush for combing action thereon while the machine is active.

What is claimed is:

1. A machine of the character described comprising a frame having side pieces, traction wheels journaled on said side pieces, a sweeper located between the side pieces and having driven connections with one of said wheels, a receiver in the frame and having a throat confronting the sweeper, and cutting mechanism arranged within the receiver and having driven connections with said sweeper.

2. A machine of the character described comprising a frame having side pieces, traction wheels journaled on said side pieces, a sweeper located between the side pieces and having driven connections with one of said wheels, a receiver in the frame and having a throat confronting the sweeper, cutting mechanism arranged within the receiver and having driven connections with said sweeper, and a scoop swingingly carried at the lowermost portion of the throat and having ground rollers.

3. A machine of the character described comprising a frame having side pieces, traction wheels journaled on said side pieces, a sweeper located between the side pieces and having driven connections with one of said wheels, a receiver in the frame and having a throat confronting the sweeper, cutting mechanism arranged within the receiver and having driven connections with said sweeper, a scoop swingingly carried at the lowermost portion of the throat and having ground rollers, and combing means within the receiver and confronting said sweeper for combing action thereon.

4. A machine of the character described comprising a frame having side pieces, traction wheels journaled on said side pieces, a sweeper located between the side pieces and having driven connections with one of said wheels, a receiver in the frame and having a throat confronting the sweeper, cutting mechanism arranged within the receiver and having driven connections with said sweeper, a scoop swingingly carried at the lowermost portion of the throat and having ground rollers, combing means within the receiver and confronting said sweeper for combing action thereon, and a ratchet pawl and gear connection between the said sweeper and its operating traction wheels.

MATTHEW S. RUDD.